G. E. REED.
BROILER.
APPLICATION FILED MAR. 18, 1920.

1,361,183. Patented Dec. 7, 1920.
2 SHEETS—SHEET 1.

INVENTOR.
George E. Reed
BY Cornelius D. Ehret
his ATTORNEY.

G. E. REED.
BROILER.
APPLICATION FILED MAR. 18, 1920.
1,361,183.
Patented Dec. 7, 1920.
2 SHEETS—SHEET 2.
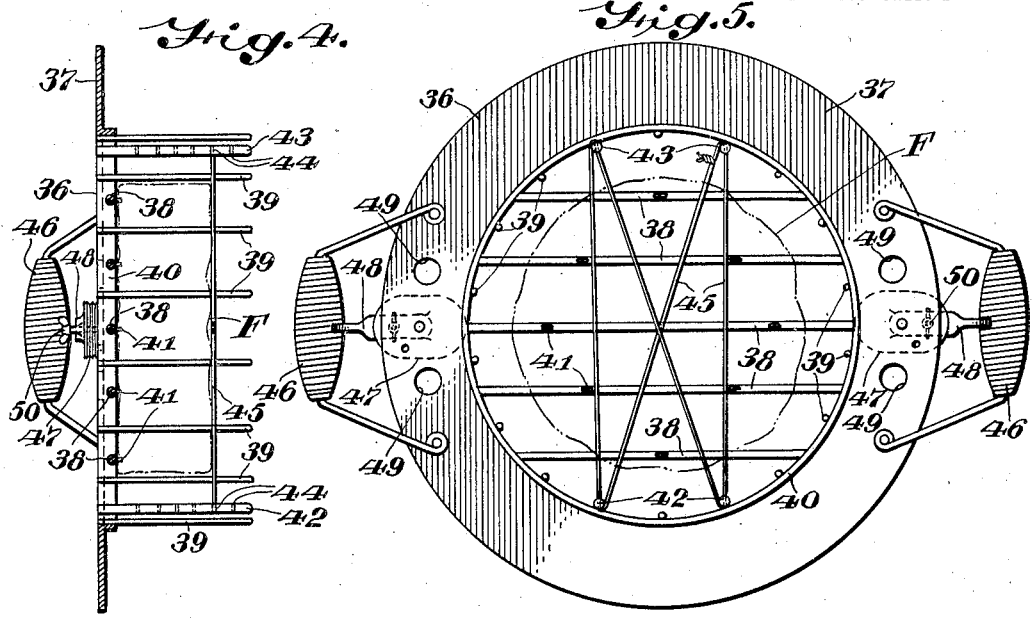
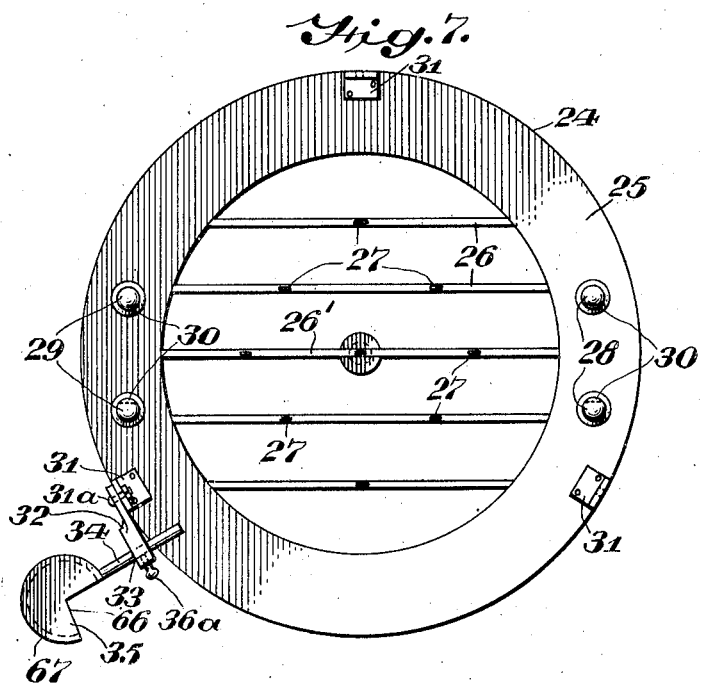
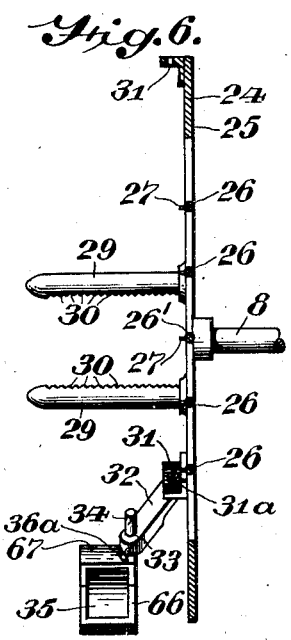
INVENTOR.
George E. Reed
BY Cornelius D. Ehret
his ATTORNEY.

UNITED STATES PATENT OFFICE.

GEORGE E. REED, OF ATLANTIC CITY, NEW JERSEY.

BROILER.

1,361,183.   Specification of Letters Patent.   Patented Dec. 7, 1920.

Application filed March 18, 1920. Serial No. 366,809.

*To all whom it may concern:*

Be it known that I, GEORGE E. REED, a citizen of the United States, residing in Atlantic City, county of Atlantic, State of New Jersey, have invented new and useful Improvements in Broilers, of which the following is a specification.

My invention relates to apparatus for cooking, as by roasting, or broiling and basting, meats, fowl, fish, or the like.

An object of my invention is to provide an apparatus in which the material to be broiled or otherwise cooked is rotatably and adjustably held in juxtaposition to suitable adjustable heating means, whereby the material may be uniformly cooked and the rate of cooking may be accurately controlled.

A further object of my invention is to provide an improved frame for holding the material to be cooked.

A further object of my invention is to provide an adjustable device for basting the material.

A further object of my invention is to provide a combination of an adjustable frame for holding material to be cooked, with means for rotating the frame in any adjusted position, and adjustable heating means and adjustable basting means.

A further object of my invention is to provide for balancing the material in the frame so that the frame and material may be rotated or rested in any desired position without rotation.

A further object of my invention is to provide an improved drip pan coöperating with the basting device.

For an illustration of one of the forms my apparatus may take, reference is to be had to the accompanying drawings, in which:

Fig. 4 is a vertical section of a frame for holding material to be cooked with the material indicated by a dot and dash line.

Fig. 5 is a plan view of a frame for holding material to be cooked with the material indicated by a dot and dash line.

Fig. 6 is a vertical section of structure for supporting the frame, showing the basting device carried thereby.

Fig. 7 is a plan view of the parts shown in Fig. 6.

Figure 1:
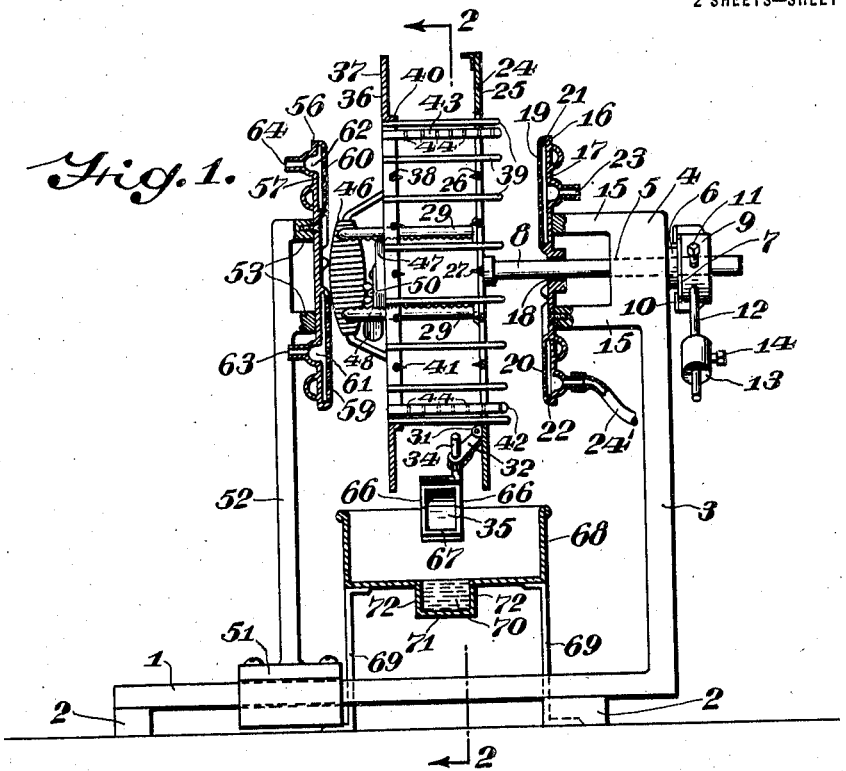
Figure 1 is a side elevation of my roasting, or broiling and basting apparatus.
Figure 2:
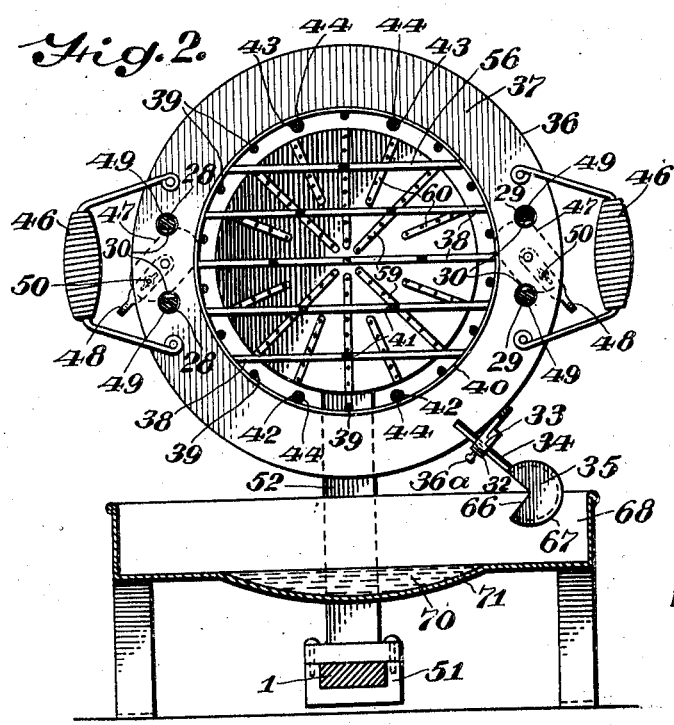
Fig. 2 is a vertical section on the line 2—2 of Fig. 1.

The example of my invention herein disclosed consists of base member 1, having legs 2 upon which is the integral or rigidly supported vertical support 3 carrying at its upper end bearing block 4, provided with opening 5. On one face of bearing block 4 is a projection 6 on the outer end of which is the circular flange 7. Projection 6 and flange 7 are provided with circular apertures registering with opening 5 in bearing block 4, opening 5 and the apertures in projection 6 and flange 7 forming a bearing for rod 8.

Slidably mounted on rod 8, is a block 9, carrying inwardly extending projections 10, spaced from the face of block 9 a sufficient distance to receive flange 7 between the projections and the face of block 9. Block 9 is provided with a threaded radially extending opening in which is set screw 11, adapted to engage shaft 8 and hold block 9 and shaft 8 in fixed relation. On block 9 is the radially extending rod 12, of any desired or suitable length, carrying the counter-weight 13. Weight 13 is slidable upon rod 12 and is provided with set screw 14, adapted to engage rod 12 and hold weight 13 in any desired position thereon.

On the bearing block 4 are projections 15, to which is suitably secured a heating device, here shown as a gas burner 16. The burner 16 comprises a base plate 17, having a central aperture 18, receiving shaft 8. Burner 16 has two sets of perforations 19 and 20, communicating, respectively, with chambers or tubes 21 and 22, supplied with gas through tubes 23 and 24, controlled by valves, (not shown), for controlling the supply of gas.

Figure 3:
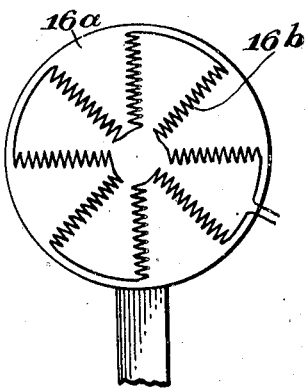
Fig. 3 is a plan view of one form of heating device.

In place of gas burner 16, an electric heater 16$^a$ having heating elements 16$^b$, Fig. 3, or any other suitable heating means may be employed.

On the end of shaft 8 is carried foraminous plate or grid 24, Figs. 6 and 7. Plate 24 comprises the circular ring 25 carrying within its circumference rods or wires 26. Wires 26 form a support for the material F to be roasted or broiled, and may be made of metal or other suitable material capable of withstanding heat and the action of the juices from the material being cooked. The wires 26 are spaced apart a suitable distance, depending upon the nature of the material to be cooked, and are preferably of small diameter so as to cover little of the surface of the material to be cooked. The wires 26 are provided with points or spurs 27 adapted to engage the material and prevent it from slipping. The ring 25 and wires 26 may, for instance, be made integral by pressing or cutting from sheet metal.

The middle wire 26′ may, if necessary, be made stronger than the other wires, and is rigidly secured to the end of shaft 8, thus holding plate 24 on shaft 8, as stated above.

Formed on or suitably secured to the face of ring 25 and projecting laterally therefrom are two pair of projections 28 and 29, preferably diametrically opposite each other, as shown; but they may be in any suitable position radially or circumferentially of ring 25. The projections 28 and 29 are of any suitable length, depending upon the thickness of the material to be cooked. Projections 28 and 29 are shown as cylindrical, but may be of any other shape, and the opposed faces of each pair of projections are provided with serrations or notches 30.

On the ring 25 are three lugs 31, at equal distances around the circumference. There may, however, be only one or any desired number of such projections. Each projection 31 is adapted to carry an arm 32, suitably secured thereto, as by means of a screw 31ª. Arm 32 may be adjusted and clamped in any desired angular position, for instance, as shown in Fig. 6, or it may be held with sufficient friction so that it may be moved to the desired position by hand and remain in that position in operation. In the end of arm 32 is an opening 33, adapted to receive handle 34, of basting cup 35. Coöperating with arm 32 is a set screw 36ª, adapted to engage handle 34, and hold basting cup 35 in any desired adjusted position.

Each lug 31 may carry a basting cup 35 as above described, or a single basting cup 35 may be carried by any one of said lugs.

The frame 36 for holding material to be cooked, Figs. 1, 2, 4 and 5, comprises a ring 37 and wires 38 similar in every respect to ring 25 and wires 26 of plate or grid 24. On the inner circumference of ring 37 and extending perpendicularly thereto, are projections 39, spaced apart a suitable distance to hold material in the frame and at the same time interfere as little as possible with the heating of the material. They may be formed integral with ring 37, or suitably secured thereto, as by riveting. As shown in Fig. 4, ring 37 is provided with an upstanding edge 40, to which projections 39 are secured by rivets. The wires 38 have points or spurs 41 similar to spurs 27 on wires 26, and for the same purpose.

Two pairs of projections 39 diametrically opposite each other, indicated as 42 and 43, are, if necessary, formed slightly larger than the remainder of projections 39 and are provided with openings 44, spaced apart a short distance. Openings 44 are adapted to receive a wire or string 45 for holding a piece of meat or other material to be cooked in position in frame 36 while the frame is being placed in the machine, as shown in Fig. 5. The frame 36 is provided with suitable handles 46, preferably handles which will not become hot, for instance, as shown, coiled wire handles.

Pivoted upon ring 37 are two latch members 47 oblong in shape or pivoted eccentrically and provided with operating handles 48. The edge of each latch member 47 is provided with serrations similar to those on projections 29. At each side of each latch member 47 are openings 49, spaced at equal distances from the pivot of the associated latch member 47. Each pair of openings 49 are spaced apart a sufficient distance and are of sufficient size to receive either pair of projections 28 or 29. The two pairs of openings 49 are diametrically opposite, so that one pair of openings will receive one pair of projections 28 or 29, while the other pair of openings will receive the other pair of projections.

Latch members 47 are of such size and shape as to engage projections 28 and 29 when said projections are inserted in openings 49. The serrations on latch members 47 engage serrations 30 on projections 28 and 29, and prevent longitudinal movement of projections 28 and 29 in openings 49. Latch members 47 are each provided with a set screw 50 adapted to engage the face of ring 37 and thus hold the latch member in fixed position.

Slidably mounted on base member 1 is a sleeve or block 51, carrying vertical standard 52, upon the upper end of which are lugs or brackets 53, to which a gas burner or electrical heating device or any other suitable heating means is secured. As shown in Fig. 1, said heating device is a gas burner 56, similar to burner 16, and formed of base plate 57 and having two sets of openings 59 and 60, supplied with gas through chambers 61 and 62, from tubes 63 and 64.

Basting cup 35 comprises two side walls 66 and peripheral wall 67. The wall 67 occupies a portion of a circle, about 270 degrees, and has its edges joined to side walls 66. Walls 66 are plane and are bounded by a part of a circle, about 270 degrees, and radii connecting the ends of the part of a circle. Basting cup 35 thus formed is a hollow cylindrical section having a quarter section of its walls, bounded by radii and the surface of the cylinder, removed. Arm 34 is secured to one of the radial edges of one of the walls 66.

Beneath the frame 25, and in coöperative relation with basting cup 35, is the gravy drip pan 68. Pan 68 may be of any suitable form to catch drippings from the material being cooked and to contain gravy or other material used for basting. It may be of sufficient width to cover all adjustable positions of frame 25, but preferably is movable and only of sufficient width to accommodate the thickest material to be cooked. As shown, pan 68 is supported at a suitable height by legs 69 and comprises a rectangular receptacle slightly longer than the diameter of ring 37 and slightly wider than the depth of frame 36. In the bottom of receptacle 69 is formed an arcuate basin 70, comprising the arcuate bottom wall 71, and plane side walls 72, 72. Basin 70 is of sufficient width to receive basting cup 35, and arcuate wall 71 is of the curvature of the circle described by basting cup 35.

The operation is as follows:

Assuming frame 36 to be removed from the apparatus, it is laid horizontal and the meat or other material to be cooked laid therein and secured by means of wire or cord 45, as shown in Figs. 4 and 5. The frame is then put in place with projections 28 and 29 extending through openings 49 and projections 39 extending through plate 24 between wires 26, and is moved toward plate 24 until the meat or other material is securely held between wires 26 and wires 38. Latch members 47 are then turned to engage projections 28 and 29 and secured in position by set screws 50. The cord or wire 45 may then be removed. Plate 24 carrying frame 36 is then adjusted to the desired distance from burner 16 by loosening set screw 11 and sliding rod 8 in bearing 5. Any unevenness in the load is counterbalanced by setting the block 9 at the desired angle on rod 8 and moving weight 13 along rod 12 and securing it by means of set screw 14. Burner 56 is then moved to the desired position on the other side of frame 36. Basting cup 35 is then adjusted, over the middle of the material to be basted, by moving arm 32. Gravy drip cup is put in place beneath basting cup 35 and the cup is adjusted to dip into the gravy therein by sliding handle 34 in opening 33 and securing it in the desired position by set screw 36ª. The gas burners 16 and 56 are then lighted and the frame 36 carrying material to be cooked is revolved, as required, for instance, by turning rod 12 by hand, or by means of a crank on the end of rod 8 (not shown) or by means of any suitable motor.

The flame of burners 16 and 56 and the distance of each from frame 36 and the material to be cooked may be adjusted as described during the cooking operation.

My apparatus may be made of any suitable materials and of any desired size. I have illustrated but one form of my invention, but it is obvious that the form illustrated may be modified in many respects without departing from my invention as defined in the following claims.

In the claims I have used the word "broiler" as a name for my apparatus, it being understood that the claims cover the apparatus regardless of the particular cooking process for which it is employed.

What I claim is:

1. A broiler including a frame comprising a base, a fixed side having a bearing and rigid with the base and an adjustable side mounted on the base for movement laterally on the frame to vary the distance between the sides thereof, heating means having relative lateral adjustment and secured to the sides of the frame, one of said heating means having an opening alined with the said bearing, and a rotary material carrying frame located between the heating means and having a horizontal shaft extending through the opening of the said heating means and journaled in the bearing of the frame.

2. A broiler including a frame comprising opposite sides or legs, one of the sides or legs being provided at its lower end with a sleeve and a base rigid with the other side or leg and extending through the said sleeve, the side or leg having the sleeve being slidable on the base to vary the distance between the said sides or legs, heating means mounted on the sides or legs, and a rotary material carrying frame located between the heating means and having a horizontal shaft extending through one of the heating means and journaled on the adjacent side or leg.

3. A broiler comprising heating means spaced apart and adjustable toward and away from each other, a frame rotatably mounted between said heating means, means for adjusting the position of said frame with respect to said heating means, and means located exteriorly of the heating means for counterbalancing said frame and material carried therein about its axis of rotation.

4. A broiler comprising a fixed, vertically disposed heating surface, a shaft extending through said heating means, a counterbalancing weight carried by said shaft and located exteriorly of the heating surface and adjustable circumferentially and radially of said shaft, a grid on the end of said shaft, a frame adapted to hold material removably secured to said grid, means for adjusting said grid toward and away from said heating surface, and a second vertically disposed heating surface opposite said fixed heating surface, said second named heating surface being movable toward and away from said fixed heating surface.

5. A broiler comprising a fixed heating surface, a movable heating surface, a grid rotatably mounted and adjustable between said heating surfaces, said grid comprising a ring member carrying transverse wires across the ring member, a pair of projections carried by and perpendicular to said ring member, a frame adapted to be carried by said grid comprising a ring member carrying transverse wires across the ring member, a plurality of projections surrounding the inner circumference of said ring member and perpendicular thereto, a pair of openings in said ring member adapted to receive said pair of projections, and a latch member on said frame adapted to engage said pair of projections.

6. A broiler comprising a frame composed of spaced sides and a connecting base portion, heating means mounted on the sides of the frame, a rotary material carrying frame having a horizontal shaft extending through one of the heating means and journaled on the adjacent side of the frame, a basting cup connected with and projected radially from the material carrying frame, and a gravy drip pan located beneath the material carrying frame and having legs straddling the base portion of the frame, said drip pan being arranged to permit the basting cup to pass through it when the material carrying frame is rotated.

7. In a broiler, a rotatable grid, means for carrying a plurality of basting cups on the grid in position for discharging directly upon the material carried by the grid, a frame comprising a grid, and a foraminous side wall surrounding said grid, and means for securing said frame to said grid.

8. In a broiler, the combination with a rotatably mounted circular grid, of points carried on the face of said grid, projections perpendicular to said grid, a frame comprising a grid having points on the face thereof, openings in said frame adapted to receive said projections, and latch members on said frame adapted to engage said projections.

9. In a broiler, the combination with a rotatable frame adapted to carry material, of means located exteriorly of the heating means of the broiler for counterbalancing said material.

10. In a broiler, the combination with a rotatable grid, a frame adapted to be carried by said grid and form therewith a receptacle for material, said frame comprising a grid and a side wall formed with perpendicular projections extending entirely across the frame, and openings in two or more of said projections adapted to receive a string or wire for holding material in said frame.

11. A broiler comprising spaced apart opposed heating surfaces adjustable toward and away from each other, a circular frame adapted to carry material rotatably mounted between said heating surfaces, said frame comprising two circular grids, one of said grids having a circular wall formed with perpendicular projections adapted to pass through openings in the other grid, and means for holding said grids in coöperative relation.

In testimony whereof I have hereunto affixed my signature this 16th day of March, 1920.

GEORGE E. REED.